Feb. 25, 1947.  L. G. MOLIQUE  2,416,490
CATALYST CHAMBER INSULATION
Filed April 13, 1943

INVENTOR.
L. G. MOLIQUE
BY
ATTORNEYS.

Patented Feb. 25, 1947

2,416,490

UNITED STATES PATENT OFFICE 2,416,490

CATALYST CHAMBER INSULATION

Lawrence G. Molique, Bartlesville, Okla., assignor to Phillips Petroleum Company, a corporation of Delaware Application April 13, 1943, Serial No. 482,946

1 Claim. (Cl. 23—288)

This invention relates to improvements in the construction of catalyst chambers of the class employed in carrying out hydrocarbon conversions in the presence of solid catalytic material, and is particularly concerned with the improvement in providing the inner insulation of such chambers with baffle members to prevent channeling of the vapors through cracks in the insulation and thus escape contact with the catalyst mass.

In the course of hydrocarbon conversions over solid contact catalysts, the catalysts ordinarily undergo progressive deactivation due to the accumulation of carbonaceous residue deposits thereon, making it imperative to reactivate the catalyst at regular intervals. It is customary to reactivate a degenerated catalyst by burning off the carbonaceous deposits. As a result of the exothermic heat of combustion developed in the course of catalyst reactivation, the catalyst mass and the chamber may be raised to temperatures within the range of about 1000° to 1500° F. The elevated temperatures are attained in the presence of free oxygen-containing fluids, such as air; and by virtue thereof, ordinary metals, when directly subjected to such temperatures, deteriorate rather quickly. Moreover, high temperatures are required during the conversion period, and since the conversion is often endothermic, it is desirable to minimize heat losses in order to maintain an efficient rate of conversion. For these reasons, it has become desirable and convenient to insulate the interior of the usual metal catalyst chamber with a liner of insulating material that is preferably of the refractory type. Such a liner protects the metal chamber from the detrimental effects of high temperatures, and in some cases enables the use of carbon steel instead of more expensive special alloy metals. Furthermore, the use of such a liner greatly reduces heat losses that would otherwise occur in the conversion process. Suitable heat resistant materials are preferably supplied to the interior walls of the chamber by casting the same therein.

In the casting of liners of the character indicated, care must be taken to make the same substantially vapor-tight in order that the hot gases and/or vapors within the chamber may not pass through cracks and other continuous passages through the liner and reach the metal shell. When this occurs, liners may be detached from the shell and hot fluids may channel between the detached liner and the inner surface of the shell, thereby by-passing the catalyst bed. Such an eventuality results in unsatisfactory operation, heat losses through the chamber, and incomplete conversion of the process material. Vapor-tight liners are extremely difficult to form because of the tendency of the insulating materials, such as refractory cements, to shrink on setting after being cast in the form of a plastic mass. This is especially true in the case of relatively large chambers, and particularly those of extended length. Experience has proven that when present day methods of insulating the interior of such liners are employed, the liners tend to crack, due to shrinkage on becoming set.

The present invention provides baffling means attached to the shell walls and embedded in the cast liner made of light gauge plate discs, to form a tortuous path that any vapors which follow channels in the insulating liner will be deflected back into the chamber. The baffling means being attached to the shell wall will expand therewith, while the insulation will not, which will prevent the vapors from following a path between the insulation and the shell wall. The baffling means are vertically spaced annular rings welded to the internal side walls of the vessels, said rings extending part way into the insulation. Any gases seeping into the insulation and arriving adjacent to the chamber shell via vertical cracks in the insulation would have to follow a tortuous path in proceeding to some other point of lower pressure in the chamber. The resistance of this path would be so great as to eliminate appreciable channeling in such manner.

It is a primary object of this invention to provide baffling means in the inner insulation liner of a catalyst chamber to prevent the vapors being treated from channeling through the insulation layer and escaping through the space between the liner and shell, and thus escaping from the catalyst chamber without passing through the catalyst body.

A further object of the invention is to provide vertically spaced annular rings welded to the internal side wall of the catalyst chamber and extending part way into the insulation layer to prevent the vapors being treated from channeling through the insulation layer and escaping through the space between the liner and shell and thus escaping from the catalyst chamber without passing through the catalyst body.

These as well as other objects and advantages will be readily apparent from an examination of the following detailed description taken in conjunction with the annexed drawing, wherein there is illustrated a preferred embodiment of the invention.

Figure 1:
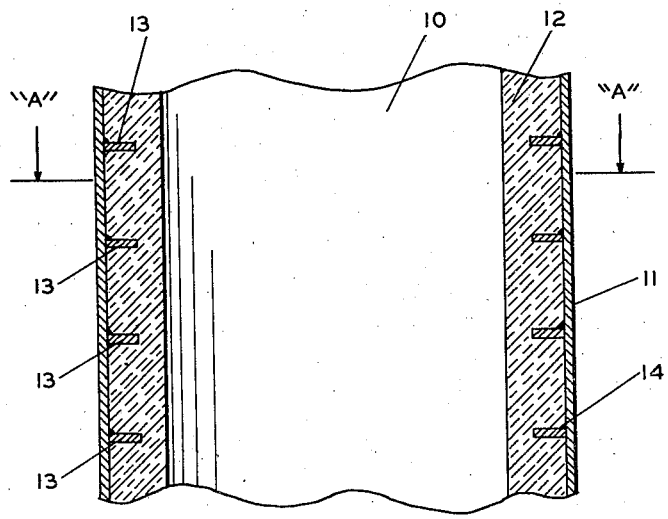
Figure 1 is an elevational view of the catalyst chamber.
Figure 2:
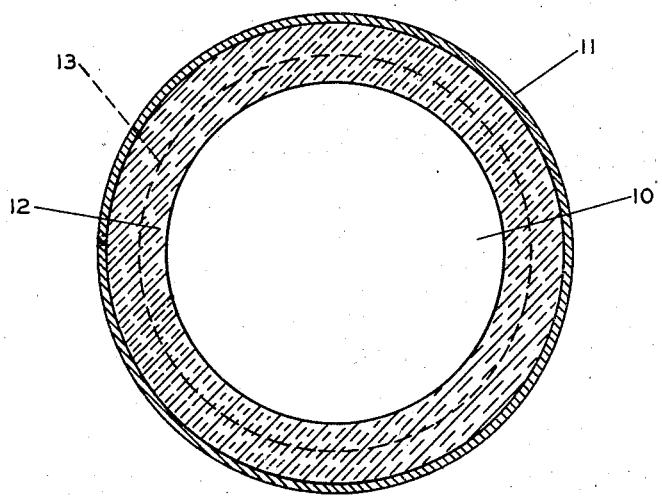
Figure 2 is a sectional view taken on the line A—A of Figure 1.

Referring to the drawing, a catalyst chamber is generally designated by the numeral 10, which chamber includes a substantially vertical side wall 11, of sheet or plate metal of requisite thickness and composition to withstand the temperature and pressure conditions to which it is subjected during normal operation. An external sheet of insulating material (not shown), preferably of the asbestos type, is placed around the shell 11. An inner layer 12 of cast insulating material, preferably of the refractory type, is placed around the inner wall of the shell.

Within the shell is a series of vertically spaced annular rings 13, seal welded at 14 to the shell 11 and extending part way into the insulating layer. Any cracks occurring in the insulating layer will allow the vapors being treated to enter these cracks and escape treatment in the catalyst. The annular rings 13 are to break up any straight through channel through the inner insulating layer, particularly the space between the shell and the insulating layer. The annular rings 13 make a tortuous path for any channels that might develop, and any passage of vapors through any channels which may develop. Moreover, the annular rings 13 will tend to direct such passage of the vapors back to the catalyst chamber to contact the catalyst.

From the foregoing, it is believed that the apparatus of the present invention will be readily comprehended by persons skilled in the art. It is to be clearly understood, however, that various changes in the apparatus herein shown and described and in the method of fabricating the same, as outlined above, may be resorted to without departing from the spirit of the invention as defined by the appended claim.

I claim:

A catalyst chamber comprising a substantially cylindrical wall having a layer of insulating material over the interior thereof, and a plurality of flat metallic baffle members each extending around the entire circumference of said wall and continuously secured thereto, said baffle members being relatively closely spaced and of such width as to extend outwardly a sufficient distance to prevent channeling of gas flow between the insulation and the wall, but completely embedded in said insulation.

LAWRENCE G. MOLIQUE.

REFERENCES CITED

The following references are of record in the file of this patent:

UNITED STATES PATENTS

| Number | Name | Date |
| --- | --- | --- |
| 1,948,391 | Montgomery et al | Feb. 20, 1934 |

Certificate of Correction

Patent No. 2,416,490.     February 25, 1947.

LAWRENCE G. MOLIQUE

It is hereby certified that error appears in the printed specification of the above numbered patent requiring correction as follows: Column 4, line 12, after "cylindrical" insert *metal*; and that the said Letters Patent should be read with this correction therein that the same may conform to the record of the case in the Patent Office.

Signed and sealed this 24th day of June, A. D. 1947.

[SEAL]

LESLIE FRAZER,
*First Assistant Commissioner of Patents.*